US007421159B2

(12) United States Patent
Yang et al.

(10) Patent No.: US 7,421,159 B2
(45) Date of Patent: Sep. 2, 2008

(54) INTEGRAL PRE-ALIGNED MICRO-OPTICAL SYSTEMS

(75) Inventors: Ren Yang, Corona, CA (US); Steven Soper, Baton Rouge, LA (US); Wanjun Wang, Baton Rouge, LA (US)

(73) Assignee: Board of Supervisor of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 11/635,944

(22) Filed: Dec. 8, 2006

(65) Prior Publication Data

US 2007/0133924 A1 Jun. 14, 2007

Related U.S. Application Data

(60) Provisional application No. 60/749,793, filed on Dec. 13, 2005.

(51) Int. Cl.
G02B 6/34 (2006.01)
(52) U.S. Cl. .......................................... 385/33; 385/137
(58) Field of Classification Search ........................ None
See application file for complete search history.

(56) References Cited

U.S. PATENT DOCUMENTS 5,175,780 A * 12/1992 Sano et al. ..................... 385/47
5,346,583 A * 9/1994 Basavanhally ................. 216/26
2002/0114578 A1 * 8/2002 Lin et al. ....................... 385/52
2003/0202752 A1 * 10/2003 Gall et al. ...................... 385/61
2005/0141815 A1 * 6/2005 Pan et al. ....................... 385/47
2005/0207018 A1 9/2005 Yang et al. ................... 359/622
2007/0071387 A1 * 3/2007 Weng ........................... 385/33

OTHER PUBLICATIONS

Sato et. al., "A Novel Fabrication of In-Channel 3-D Micromesh Structure Using Maskless Multi-Angle Exposure and Its Microfilter Application," Proceedings of the IEEE MEMS Conference, Kyoto, Japan (2003).

* cited by examiner

Primary Examiner—Sung Pak
Assistant Examiner—Mike Stahl
(74) Attorney, Agent, or Firm—John H. Runnels; Bonnie J. Davis; James C. Carver

(57) ABSTRACT

An accurate and inexpensive integral micro-optical system for coupling and aligning optical fibers with other optical components, such as other optical fibers, diffusers, beam shapers, beam splitters, mirrors, or lenses is disclosed. The micro-optical coupler disclosed comprises one or more fiber-port collimators and one or more microlens arrays, optically aligned during fabrication so that an optical fiber, or other source of light, was coupled to another optical fiber, or other light receiver, by simple inserting the optical source in one side of the micro-coupler and inserting the optical receiver in the other side of the micro-coupler. Often the fabrication process for this system can be done in a single lithography procedure. Since the optical axis of each component was aligned during the fabrication step, no subsequent alignment was required.

20 Claims, 8 Drawing Sheets

INTEGRAL PRE-ALIGNED MICRO-OPTICAL SYSTEMS

This application claims priority from provisional application 60/749,793, filed Dec. 13, 2005 under 35 U.S.C. §119(e).

The development of this invention was partially funded by the Government under grant EB002115 awarded by the National Institutes of Health, and under grants number DBI-0138048 and EPS-0346411CHE-0304833 awarded by the National Science Foundation. The Government has certain rights in this invention.

This invention pertains to an integral pre-aligned micro-optical system, in which all components may optionally be fabricated in a single procedure.

Optical fiber is widely used in telecommunication and optical sensors. These optical fibers are often part of a micro-optical system comprising microlenses, microcouplers, light and signal transmitters, and light and signal receivers. Fiber couplers are important components of optical-based systems in which two or more micro-devices are linked, for example, in optical communication systems. Also, fiber couplers connect light sources to optical fibers, optical fibers to optical fibers, and optical fibers to detectors. When optical devices are connected, for example when two optical fibers are linked, there is a loss of signal. Conventional couplers often lose signals, for example, because of reflection, refraction, and alignment errors. Eliminating or controlling reflection, refraction, and scattering of radiation from misalignment will increase transmission of light, and therefore throughput of the signal.

Conventional micro-optical components are fabricated one component at a time, and each component or device is typically fabricated in the same plane as the substrate. Assembling a micro-optical device using individually fabricated micro-components is time-consuming and requires great care. For example, conventional optical fiber coupling systems require manual assembly and careful alignment of fibers with a coupler. Therefore, the chances of misalignment are significant.

Fiber coupling is subject to three general types of misalignment: (1) separation (longitudinal misalignment, z axis); (2) offset (lateral misalignment, x axis); and (3) tilt (angular misalignment, $\theta$). Separation or longitudinal misalignment often results when the ends of the fibers are not optimally positioned. If the end of the second or receiving optical fiber is positioned away from the imaging position of the first or transmitting fiber, the propagating light will spread and lose intensity before it reaches the second or receiving fiber. Offset error occurs when the fiber cores are displaced laterally, perpendicular to the optical axis. If the fibers are laterally displaced, some light emitted from one fiber core is directed onto the cladding layer of the second fiber core, resulting in reduced light throughput. Tilt or angular misalignment occurs when one fiber is tilted, or rotated relative to the second fiber or other optical device. Such angular misalignment also causes a loss of signal. Proper alignment of coupled components is, critical to ensuring the maximum signal propagates through the system.

Conventional fiber couplers transfer light from a source, for example a laser, a diode, a lamp, other radiation source, or the end of another fiber, to a receiving fiber or a detector by focusing the light from the source or first fiber with a lens onto the receiving fiber or detector. Conventional fiber couplers employ mechanically adjusted "fiberport collimators" to properly position a fiber with a lens to obtain the maximum coupling efficiency. A fiberport collimator is an array of collimators that is used to align multiple fibers for coupling with other devices. Fiberport collimators are mechanically adjustable for the coordinates x, y, and z, and angle $\theta$. Significant signal loss begins when the tilt alignment error exceeds about $\pm 10°$, or when the fibers are misaligned in the x, y, or z direction by more than $\pm 20$ μm. The precision of alignment using mechanical fiberports tends to decrease with the complexity of the optical system. This complexity includes the number of couplers, the physical dimensions of the optical fibers, and the experience and skill of the operator. Significant time and expense are required to obtain good alignment using conventional techniques.

Some fiberport/coupling systems have been made by microfabrication. For example, silicon micromachined V-groove fiber couplers have been used to align optical fibers. These V-groove fiber couplers can be directly integrated with other optical components.

Several methods are used to fabricate microlenses and microlens arrays, which are often used to improve coupling efficiency. For example, spherical fiber tips, also known as "ball lenses," are fabricated by simply melting the end of a fiber. Micro-jet technology can also be used to form a lens at the end of a multimode fiber. Ball lenses also have been formed by thermal re-flowing of positive photoresist materials, wherein after the resist is developed, it is melted and then reformed into a ball lens. Most previously reported fiber optic coupling techniques have fabricated one component at a time, and each optical component has been made in the same plane as that of the support substrate.

Yang et al., US application 2005/0207018, reported using a tilted beam method, wherein two or more radiation beams intersect within a resist, to form microlenses with quasi-spherical surfaces. Sato et al., "A Novel Fabrication of In-Channel 3-D Micromesh Structure Using Maskless Multi-Angle Exposure and Its Microfilter Application", *Proceedings of the IEEE MIMS Conference*, Kyoto, Japan, pp. 223-226 (2003) reported using multi-angle tilted lithography in SU-8 for making through-holes for fluidic filter applications.

There is an unfilled need for improved methods to align components in micro-optical systems, both accurately and inexpensively.

We have discovered integral fiber bundle couplers which accurately and inexpensively align components in a micro-optical system, such as fiberport collimators, optical fibers, diffusers, beam shapers, beam splitters, mirrors, or lenses.

By using tilt, multi-exposure lithography of a relatively thick photoresists we were able to fabricate a coupler linking two or more micro-devices within an integral micro-optical system above the plane of a suitable substrate during fabrication. Often the fabrication process can be done in a single lithography procedure.

We designed into optical masks used in the lithography process all or most of the pixels desired. Individual micro-optical components are sometimes referred to a "pixels." The relation of the mask opening to the shape of the optical device is straightforward. If the radiation is perpendicular to the surface, the opening in a mask will simply be the opening shape projected in three dimensions. For example, if a mask opening was a perfect circle, then its three dimensional projection would be a round cylinder. When the radiation is tilted, then the diameter of projection of that radiation will be shortened in one direction by the cosine of the angle of incidence, $\alpha$. For example, if radiation impinges a photoresist through a mask with an opening that is a perfect circle at angle $\alpha$, an elliptical cylinder will be projected into the photoresist below the mask, with one axis of the ellipse equal to the diameter of the circle in the mask and the other axis of the ellipse equal to the diameter of the circle in the mask times cos α, the angle of incidence of the impinging radiation.

An appropriate radiation source, for example visible radiation, UV radiation, X-ray radiation, an electron beam, a proton beam, or other particle beam may be used. Any negative photoresist material may be used.

If a negative photoresist material was irradiated from at least two angles, so that the radiation beams intersected at a predetermined location within the photoresist, micro-optical devices were formed in the multiply-exposed region. When the photoresist. was developed, the unexposed region quickly dissolved, while the multiply-exposed regions remained. One or more of the desired optical components was formed at the intersection of the beams, with corresponding components being aligned during fabrication. Since the optical axis of corresponding components was aligned during the fabrication step, no subsequent alignment was required. In a preferred embodiment, ultra-violet radiation impinged from two angles intersecting at 90° to each other within a SU-8 photoresist deposited on silicon to form the novel devices.

When the mask for the optical fiber bundle coupler was designed, it had openings of two types, one to create fiberports, and one to create microlenses, wherein each component was formed along a common optical axis. The mask and wafer were held mechanically without adjustment, and the entire assembly was tilted to +45° and irradiated. Then the entire mask/photoresist was tilted −45° and irradiated again.

The novel device is an integral pre-aligned fiber bundle coupler comprising microlens arrays and fiberport collimators positioned above a support substrate. Our device allows us to couple a plurality of optical fibers to other optical components, for example other optical fibers, light sources, light receivers, splitters, lenses, diffusers, mirrors, etc., with extreme precision. This device is capable of aligning an optical beam propagating from one component coupled to another component with a tilt tolerance equal to or less than 20°, without adjustment by the user. This device also is capable of aligning an optical beam propagating from one component coupled to another component with a translational tolerance equal to or less than 10 µm, without adjustment by the user. Prior micro-optical devices require extensive assembly and post-fabrication alignment resulting in an expensive device requiring significant user skill and time. Our device maximizes the optical throughput of a micro-optical coupler in a simple, consistent manner at a significantly lower cost of initial fabrication and at a significant lowering of labor requirements.

Figure 1G:
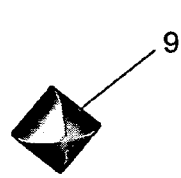
FIG. 1G depicts a prototype microlens.
Figure 1A:
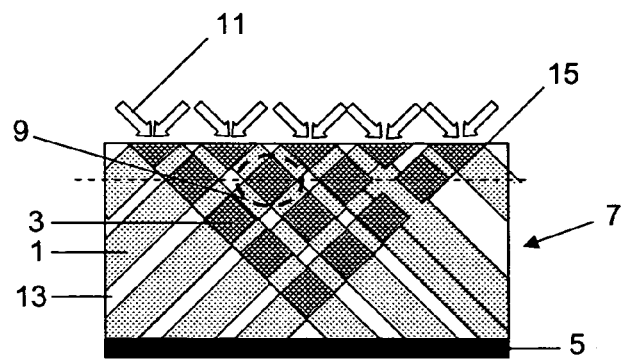
FIGS. 1A through 1C depict a process used to form the out-of-plane microlens array.
Figure 1C:
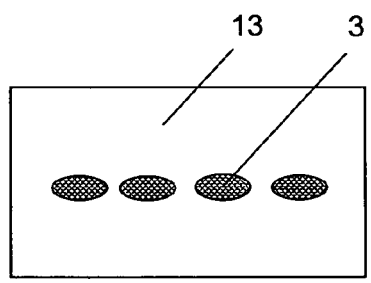
Figure 1B:
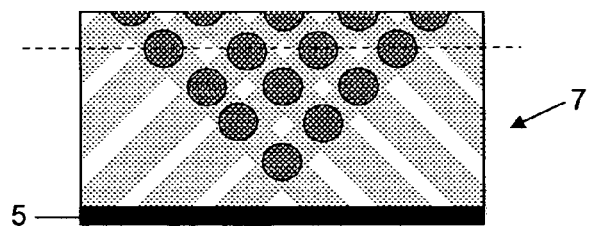
Figure 1D:
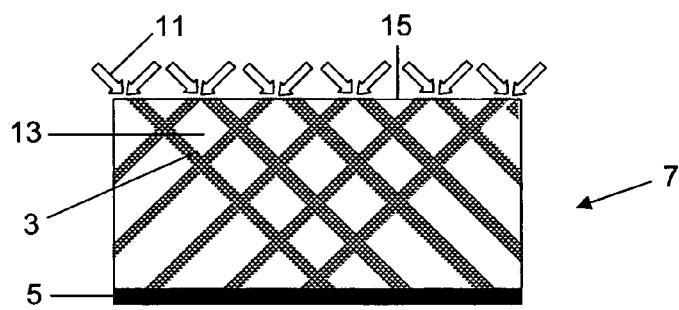
FIGS. 1D through 1F depict a process used to form the integral fiber bundle couplers.
Figure 1E:
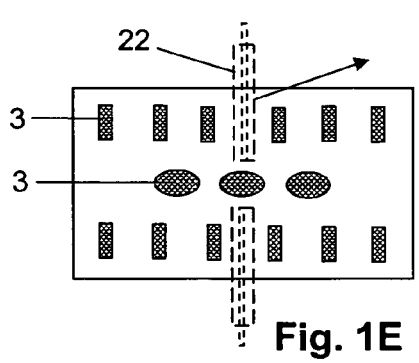
Figure 1F:
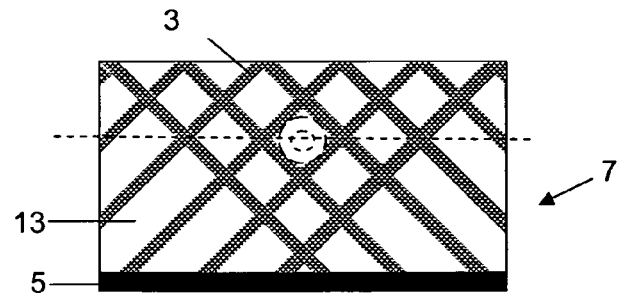

The three-dimensional fabrication method of Yang et al., U.S application Ser. No. 2005/020718, which is incorporated by reference, was used to fabricate prototype pre-aligned fiberport collimator arrays and out-of-plane microlens arrays in accordance with the present invention, as illustrated in FIGS. 1A through 1G. As shown in FIG. 1A, UV radiation 11 impinges onto the surface of a photoresist 7 (which is on a support substrate 5) at two angles, +45° and −45°. A mask 15 was placed over the photoresist, and columns of radiation penetrated the full depth of the photoresist. The second beam also penetrated the full depth of the photoresist. Along the paths of the radiation, the photoresist was exposed 1, and at the intersection of the two paths the photoresist was "double exposed" 3. A portion of the photoresist 7 remained unexposed 13. When developed, an array of out-of-plane microlenses 9 remained. FIG. 1B depicts the device after development. FIG. 1C depicts the doubly exposed and developed device from the top. FIGS. 1D through 1F depict the formation of the fiber bundle coupler. FIG. 1D depicts a side view of radiation passing though a mask 15 over a photoresist 7 and the resulting array of cavities or holes (the fiber bundle coupler). The array of holes is precisely aligned with the microlens array also formed in the same photoresist during the two exposures. FIG. 1E shows the microlens array/fiber bundle coupler array from the top. FIG. 1F depicts the bundle coupler accepting an optical fiber 22 aligned with a microlens. FIG. 1G depicts a prototype microlens 9.

Our prototype fabrication method employed multiple-step UV-lithography of SU-8 at a plurality of angles and energies. Other negative photoresist materials may be used instead of SU-8. Generally, the part of the photoresist in which the microlenses are formed received less radiation than the part of the photoresist in which the fiber couplers are formed. While the unexposed part of the photoresist is rapidly removed, and the doubly exposed part of the photoresist is extremely difficult to remove, the degree of development of a singly exposed or less exposed part of a negative resist depends upon how it is developed. Thus, we controlled the development process for both the fiberport collimator array and the microlens array to optimize both. Each component or pixel of the out-of-plane microlens array was pre-aligned with the corresponding hole in the fiberport collimator. Thus, no further alignment or post-fabrication adjustment was required in use.

All components or pixels of the prototype integral micro-optical system were formed through two exposures, for example one exposure at +45° and a second exposure at −45°. The mask was designed to allow areas within the photoresist to be irradiated by two or more intersecting beams. The regions within the photoresist that corresponded to the beam intersections were converted into optical components. Once the micro-optical devices are formed within the integral structure, they are and remain aligned with each other and require no mechanical assembly or additional alignment. Optionally, the optical axis of each pixel is parallel to the support substrate, and parallel to that of other pixels. By creating a mask design that included elements for both microlens arrays and fiberport collimators, an integrated system comprising a microlens array pre-aligned with fiberport collimator arrays was fabricated. Precise alignment was obtained without adjustments, as required in conventional systems, which avoids propagation of error with each adjustment. Our device may be used without adjustments and may be fabricated inexpensively, while providing excellent alignment quality, coupling efficiency, and signal throughput.

Masks for prototype embodiments were commercially made based on designs that we provided. The design of the mask was based on calculation of the shape of the intersecting radiation beams. The masks were designed so that the desired pixels, for example, a fiberport and a microlens, were pre-aligned in appropriate positions without requiring further assembly or alignment. The prototype design placed the optical axis of the pre-aligned pixels parallel to the substrate on which the optical system was built.

Figure 2:
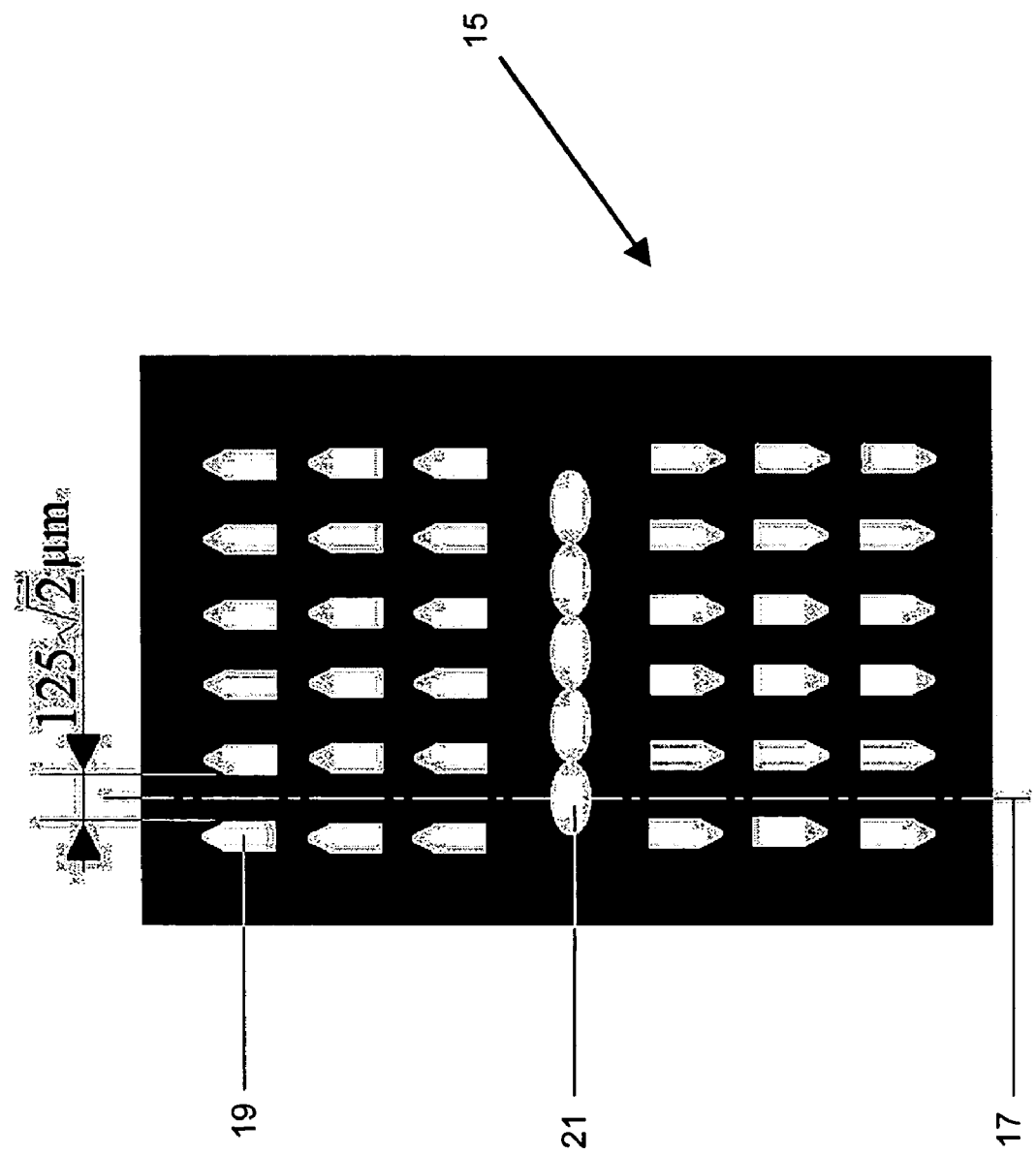
FIG. 2 depicts a mask pattern that produced a fiber bundle coupler and microlens array in accordance with the present invention.

In general, the curvature of a mask opening controls the geometry of the out-of-plane microlens. For those mask openings that lie along a single axis, the resulting microlenses will be formed along a common optical axis. A prototype mask, 15, is shown in FIG. 2. There were two sets of similar openings in this mask. This mask was designed so that exposure of an underlying photoresist through it produced a fiberport collimator array (exposure through openings 19) and an out-of-plane microlens array (exposure through openings 21). Elliptical openings in photomasks resulted in a circular cylindrical-shaped light beam penetrating the SU-8. The eccentricity of the opening in a mask may be altered to change the geometry of the microlens or microlens array if desired. Circular openings in photomasks were used to form ball lenses. Additionally, other openings shapes in a mask, for example, parabolas or hyperbolas, may be used to form other geometries of out-of-plane micro-optical components as desired.

In a preferred embodiment, we used optical fibers that were about 125 μm in diameter. Thus, square openings for a fiberport collimator to accept these fibers should have dimensions of at least 125 μm by 125 μm. To meet this requirement, we set the distance between the two open blocks in the mask component that formed the fiberport collimator to be $125\sqrt{2}$ μm, as shown in FIG. 2. FIG. 2 shows a prototype mask 15 for fiber bundle couplers with a plurality of openings 19 for a fiberport collimator array. The opening for an out-of-plane microlens array is designated as 21. The lens' optical axis was designated as 17.

A negative photoresist layer is deposited by spin-coating on a support, for example silicon or glass. Typically the photoresist layer is at least 5 μm. The spin coating is conducted at about 200-2000 rpm for about 10-50 s, depending on the thickness desired. The resulting resist-covered wafer is then soft-baked at about 100° to 150° C. for 8 to 12 hours, after which the temperature is slowly reduced to room temperature. An optical mask is then mechanically held in fixed relationship to the photoresist/wafer-support assembly. Glycerin may be placed between the mask and the photoresist to ensure good contact. The mask-covered, resist-coated wafer is then exposed to radiation two or more times.

In a preferred embodiment we generated a coating of SU-8 that was about 1000 μm thick, by spin-coating at about 400 rpm for about 20 seconds. The resulting resist-covered wafer was then soft-baked at 110° C. for 10 hours, after which the temperature was reduced to room temperature over an 8 hour period. An optical mask was then placed above the wafer (with a thin layer of glycerin between the mask and photoresist), and mechanically held in a fixed position relative to the wafer/photoresist assembly. The wafer then was exposed to UV radiation twice through the mask. The wafer/mask assembly was first tilt-exposed at +45° and then tilt-exposed at −45°, where these angles were measured from the normal to the surface of the wafer/mask. While the angle between the impinging radiation for the two exposures is typically 90°, other angles may also be used. We used a full exposure dosage at each angle as required for proper development of the fiberport collimator and about ½ full exposure dosages at each angle for proper development of the microlens array. The exposure dosage was based on the manufacturer's recommendation. Following radiation, the wafers were baked at about 96° C. for 20 min., after which they were cooled to room temperature over about 12 hours. The unexposed regions of the wafer were removed during development, over a time period of no more than 12 hours, leaving the exposed regions of resist in the form of microlens arrays aligned with fiber-positioning holes.

In fabricating a plurality of different pixels, we sometimes used a shadow mask to prevent overexposure of one or more of the pixel arrays. For example, after the region where the microlenses or the microlens arrays were located was exposed, a shadow mask blocked further exposure of that region, while the remainder of the photoresist continued to be exposed.

The geometry of microlenses may be affected by wavelength selection and development conditions, in addition to the mask pattern and exposure dosage. The wavelength of the irradiating light was controlled to help obtain the desired lens profile. We used a commercially available UV light source from Oriel. There were three main emissions, the i-line ($\lambda$=365 nm), the h-line ($\lambda$=405 nm), and the g-line ($\lambda$=436 nm). The shortest-wavelength radiation at 365 nm is strongly absorbed by the photoresist, while the longer wavelength emissions are absorbed less. The shorter wavelength i-line was filtered using a PMMA filter, to prevent the top of the photoresist from being overdeveloped relative to the deeper portions. The longer wavelength lines penetrated better, and allowed a more even exposure throughout the thick photoresist. In a preferred embodiment, we used an h-line ($\lambda$=405 nm) dominated UV light source.

The conditions under which the photoresist is developed may affect the final geometry of a microlens. SU-8 is a negative tone photoresist. The exposed regions remain after lithography and development. The development rate for SU-8 depends on whether it is unexposed, singly-exposed, or multi-exposed. The mask blocks a portion of the photoresist from exposure, while a part of the photoresist is exposed at each angle, resulting in a portion of the photoresist being singly-exposed and, if for two exposures, a portion of the photoresist being doubly-exposed. During development of a negative photoresist, the unexposed regions are rapidly dissolved and the doubly-exposed regions are very stable. The portion of the photoresist that is singly-exposed will dissolve at an intermediate rate. Proper selection of exposure dosage, wavelength, and development time helps shape the developed intersection regions into out-of-plane microlenses and microlens arrays.

FIGS. 1A through 1G depict steps in the fabrication and use of a fiber bundle coupler in accordance with the present invention. FIGS. 1A through 1C depict the formation of a microlens array. FIG. 1A depicts the exposed photoresist 7 after tilt-exposure and before development, depicting the unexposed resist 13, the partially exposed resist 1, and the doubly exposed resist 3. The substrate 5 is shown beneath the resist. FIG. 1B shows developed photoresist 7 after development. A three dimensional illustration of a lens 9 formed by this process also is depicted in FIG. 1G. FIG. 1D depicts how the fiber bundle coupler array was formed. FIG. 1E depicts a top view of the developed photoresist 7. FIG. 1F shows the prototype fiber-microlens-fiber system with a optical fiber 22 inserted.

The outer polymer coating layers were stripped from optical fibers prior to insertion into the fiberport collimator. After the outer layers had been stripped, the diameter of the center fiber (including both core and clad) was 125 µm. To optimize the alignment of a fiberport collimator with this optical fiber, a fiberport collimator with square openings 125 µm by 125 µm is preferred. With the 45° tilted lithography, to obtain such dimensions the distance between two adjacent open blocks in the mask for the fiberport collimator was $125\sqrt{2}$ µm, as shown in FIG. 2. The dimensions may change as needed to accommodate different sized fibers. To facilitate the fabrication process in a thick photoresist, a multiplicity of overlapping holes are used as shown in FIG. 2. To insert the optical fibers into the fiberport collimators more easily, an opening slightly larger than the optical fibers' outside diameter may be used.

We used an Oriel UV station for the lithography radiation and a 4.54 mm thick PMMA filter. This source had three main emissions, the i-line ($\lambda=365$ nm), the h-line ($\lambda=405$ nm), and the g-line ($\lambda=436$ nm). We tested the transmission of this source through a 1 mm thick unexposed SU-8 layer. The shorter wavelength is primarily absorbed near the surface, while the longer wavelengths penetrate further into the resist, extending to the bottom. The absorption coefficient of unexposed SU-8 for the h-line ($\lambda=405$ nm) is about one-fourth of the absorption coefficient of the i-line ($\lambda=365$ nm), and 3 times the absorption coefficient of the g-line ($\lambda=436$ nm). To achieve relatively uniform exposure through the entire depth of the resist, the shorter wavelength (e.g. 365 nm) should be filtered to avoid over-exposure of the surface layer. Longer wavelengths (e.g., g-line or h-line) reach deeper parts of a thick SU-8 resist layer, achieving better uniformity of exposure. Transmission of the PMMA was about 0.3% at the i-line, 82% at the h-line, and 82% at the g-line. Thus, because the g-line is absorbed by the SU-8 so much more weakly than the h-line, the Oriel UV station with a PMMA filter was an h-line dominated source.

A full exposure dosage at each angle was used for the fiberport collimators to cure throughout the entire depth of the resist. Under these conditions, dissolution of fully exposed sections of SU-8 was negligible. When a negative resist is fully exposed, it becomes essentially insoluble and is largely unaffected by development time or conditions. Thus, the shape of a fiberport collimator array depended only on the geometry of the mask pattern.

Figure 3:
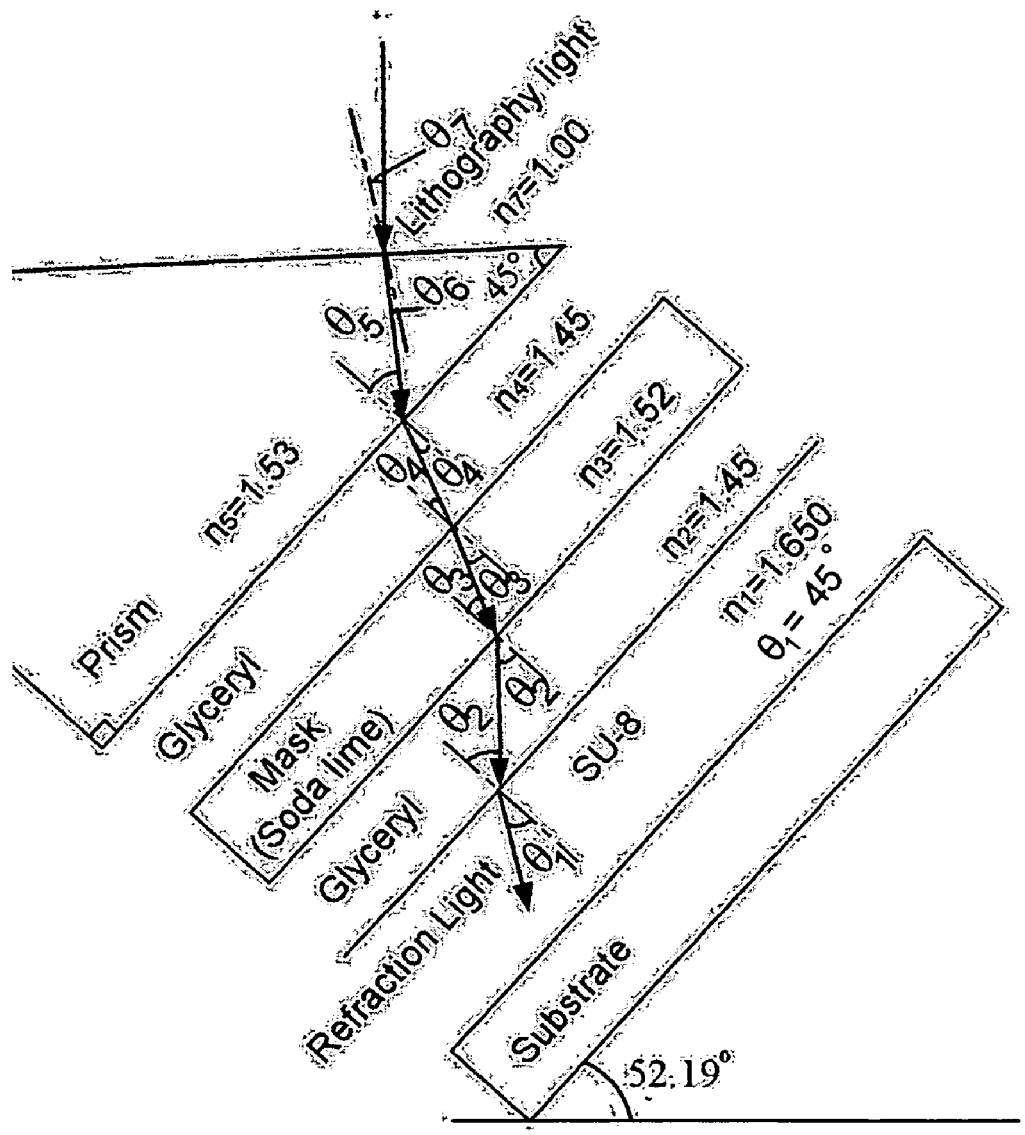
FIG. 3 depicts a diagram illustrating the angle compensation needed due to refraction of the radiation as the radiation passed from one medium to another medium to cause impinging radiation ($\lambda$=405 nm) to fall on the surface of the photoresist at a 45° angle.

For out-of-plane exposure for the lenses, the refraction of incident light will generally be non-negligible, and should be taken into account. The refraction of light at the surface of SU-8 varies as a function of wavelength. For h-line light ($\lambda=405$ nm), the refractive index is n=1.650, making the critical angle 37.305°. (The critical angle is defined as the smallest angle of incidence at which radiation, passing from a higher refractive index medium to a lower refractive index medium, is totally reflected at the boundary between the two media.) For i-line light ($\lambda=365$ nm) the refractive index is n=1.660, making the critical angle 36.836°. To obtain 45° exposure angles within the SU-8 resist, a coupling prism and optical liquid, for example glycerin, may be used to compensate for refraction at the interfaces. FIG. 3 depicts how the light path of incoming radiation is changed by refraction as the radiation passes from one medium to the next. In the example of FIG. 3, to obtain a refractive angle of 45° for radiation at $\lambda=405$ nm, the radiation impinges at an angle of 52.19°. For different wavelengths, the appropriate impinging angle may change. For example, for $\lambda=365$ nm, the radiation would impinge at 53.32° to achieve an angle of 45°.

EXAMPLE 1

An 1100 µm layer of SU-8 100 was spin-coated onto a silicon substrate at 400 rpm for 20 s. The sample was then soft-baked at 110° C. for 10 hours and ramped down to room temperature in 8 h. Two consecutive exposures were made at different angles. A mask with one set of openings for microlenses was used. The mask and wafer were held mechanically without adjustment. In the first exposure, the sample was tilt-exposed at ±45° to fabricate the microlens array. In this exposure, the exposure dosage and light source wavelength were controlled to obtain the desired lens profile, as previously discussed. After the exposure for the microlens array, a shadow mask was placed on the optical mask to cover the regions containing the microlens array. A second set of tilted-exposures at ±45° was made for the fiber-positioning holes using a full exposure dosage. The sample was then post-baked at 96° C. for 20 min. and cooled to room temperature over 12 hours. After the unexposed regions were removed by development, the remaining exposed regions of resist formed the single row microlens array and fiber-positioning holes.

EXAMPLE 2

An 1100 µm layer of SU-8 100 was spin-coated onto a silicon substrate at 400 rpm for 20 s. The sample was then soft-baked at 110° C. for 10 hours and ramped down to room temperature in 8 h. Two consecutive exposures were made at different angles. A mask with two sets of openings for the microlenses was used. The mask and wafer were held mechanically without adjustment. In the first exposure, the sample was tilt-exposed at ±45° to fabricate the microlens array. In this exposure, the exposure dosage and light source wavelength were controlled to obtain the desired lens profile, as previously discussed. After the exposure for the microlens array, a shadow mask was placed on the optical mask to cover the regions containing the microlens array. A second set of tilted-exposures at ±45° was made for the fiber-positioning holes using a full exposure dosage. The sample was then post-baked at 96° C. for 20 min. and cooled to room temperature over 12 hours. After the unexposed regions were removed by development, the remaining exposed regions of resist formed the double row microlens array and fiber-positioning holes.

EXAMPLES 3-5

Figure 4:
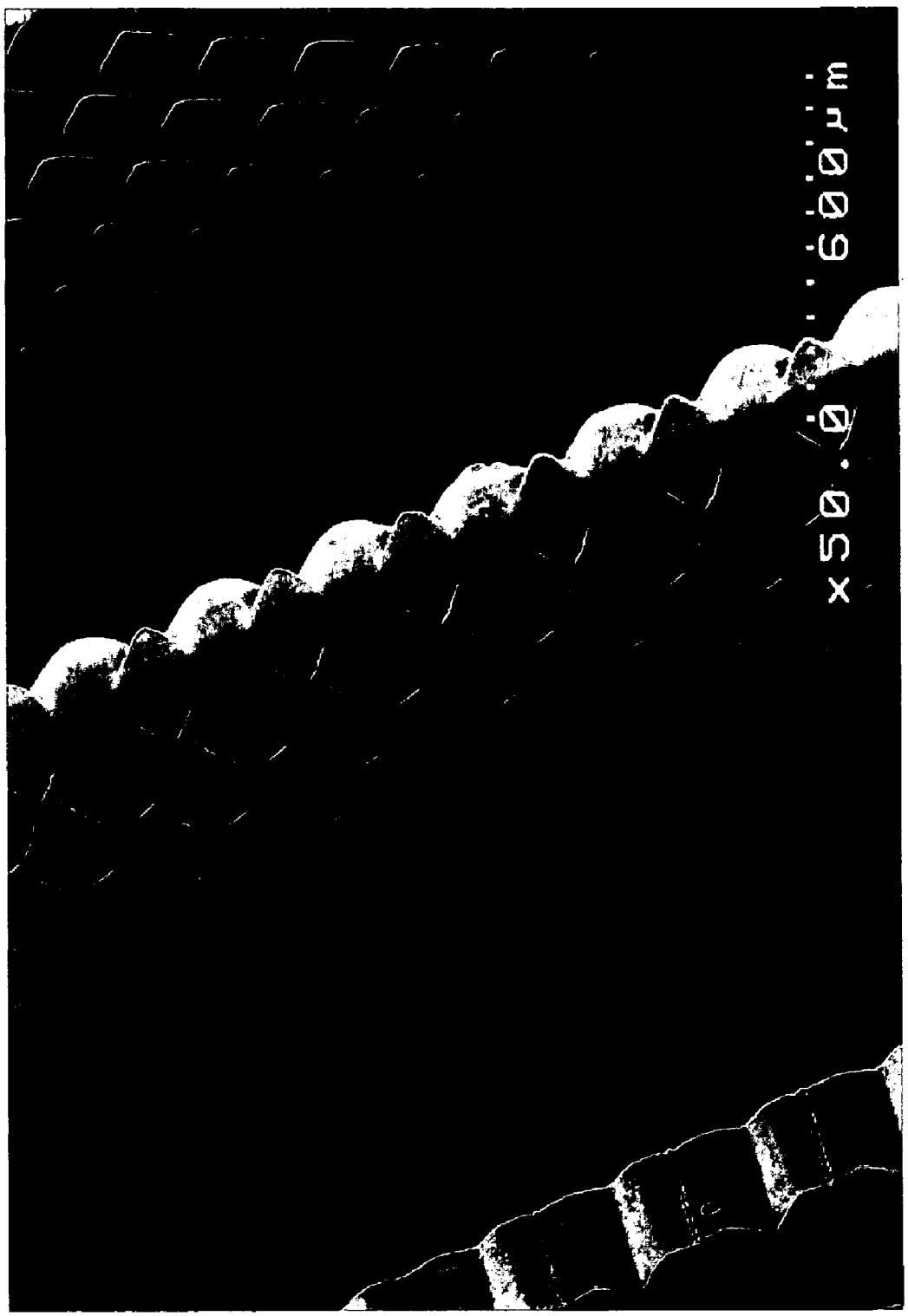
FIG. 4 depicts an SEM image of a prototype fiber bundle holder.
Figure 5B:
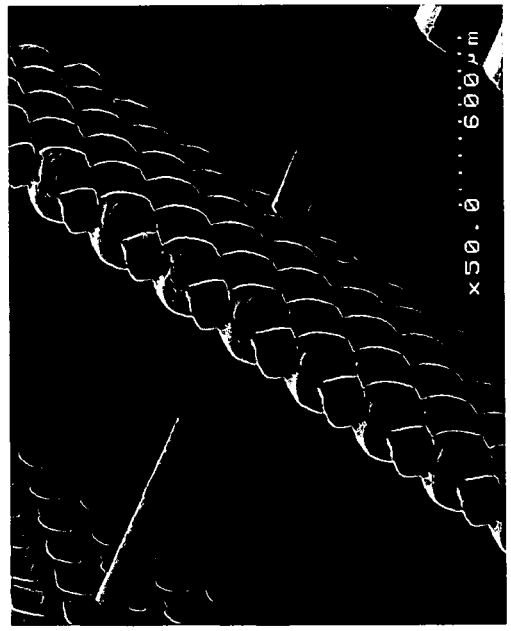
FIG. 5B depicts an SEM image of a prototype fiber coupler as shown in FIG. 5A at higher magnification.
Figure 5D:
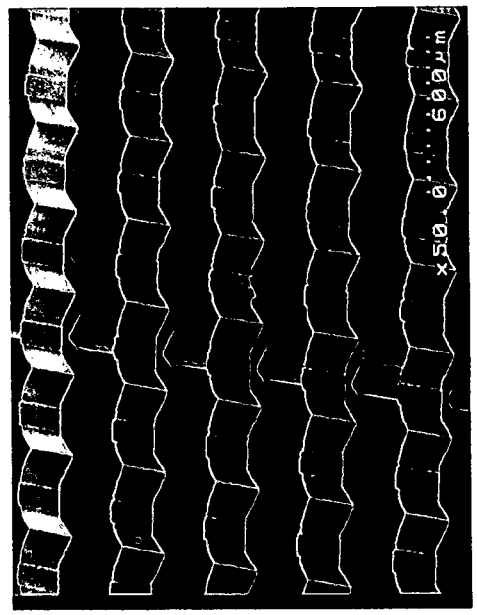
FIG. 5D depicts an SEMS image of an optical fiber inserted into an integral fiberport collimator.
Figure 5A:
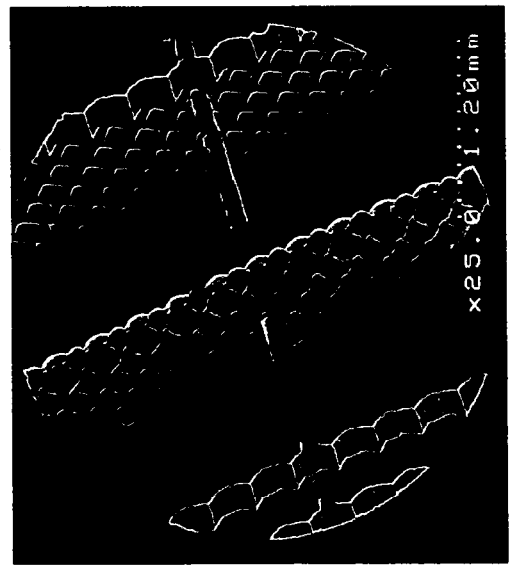
FIG. 5A depicts an SEM image of prototype fiber coupler for an integral microlens array.
Figure 5C:
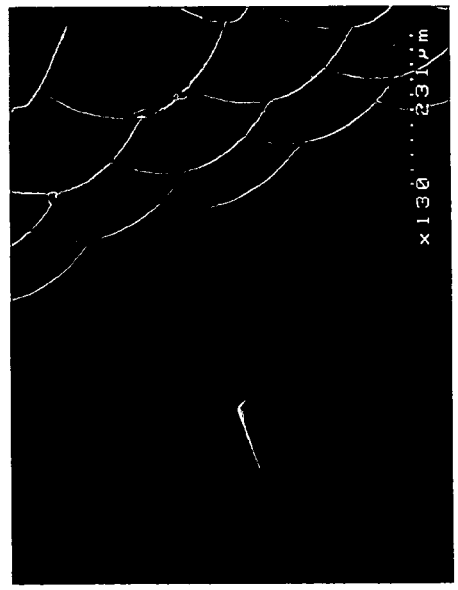
FIG. 5C depicts an SEMS image of an optical fiber and an integral microlens array.

Three groups of masks were made: Group 1 masks had elliptical openings in which the length of the long axis was $\sqrt{2}$ times the length of the short axis, with the long axis perpendicular to the optical axis of the lens. Group 2 masks had circular openings, which were used to form ball lenses. Group 3 masks had elliptical openings in which the length of the long axis was $\sqrt{2}$ times the length of the short axis, with the long axis aligned with the optical axis of the lens. FIG. 4 shows a SEM image of prototype fiber bundle holders and lenses (Group 3) fabricated with the direct lithography method described above.

EXAMPLE 6

Optical fibers were inserted into the fiber holes of the microstructures, fabricated using Group 1 masks, to test the fiber couplers. The optical fibers were prepared by stripping the plastic claddings from the ends with fiber stripping tools, and the fiber ends were terminated using a fiber cleaver (Thorlabs Inc., Newton, N.J.), and then cut to an appropriate length.

The terminated optical fibers were then inserted into the positioning holes of the fiber coupler. FIGS. 5A to 5D show SEM images of the fabricated fiber coupler with a single optical fiber inserted into each side of the array, for clarity of illustration. Each pixel of each microlens was accurately pre-aligned with its corresponding fiber holders.

EXAMPLE 7

Figure 6B:
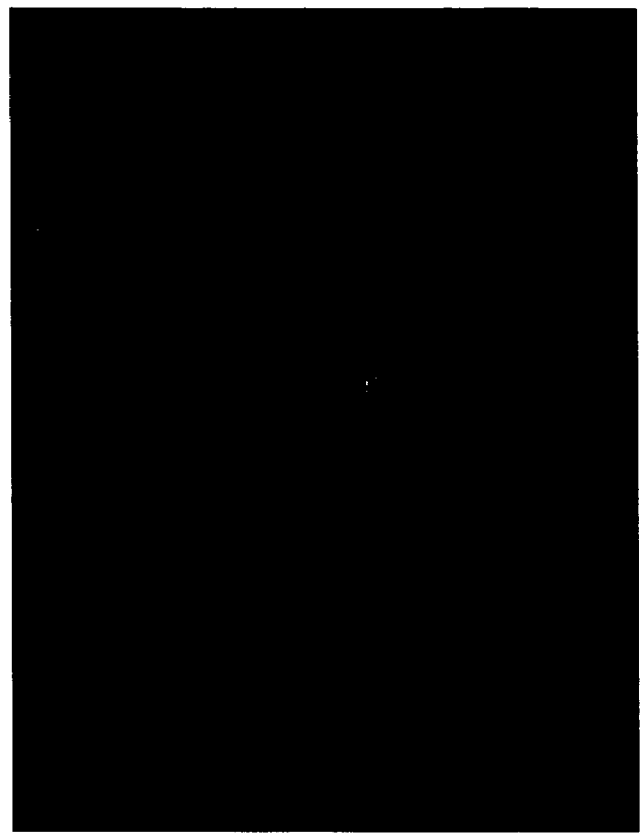
FIG. 6B depicts an optical image collimated light from a single fiber.
Figure 6A:
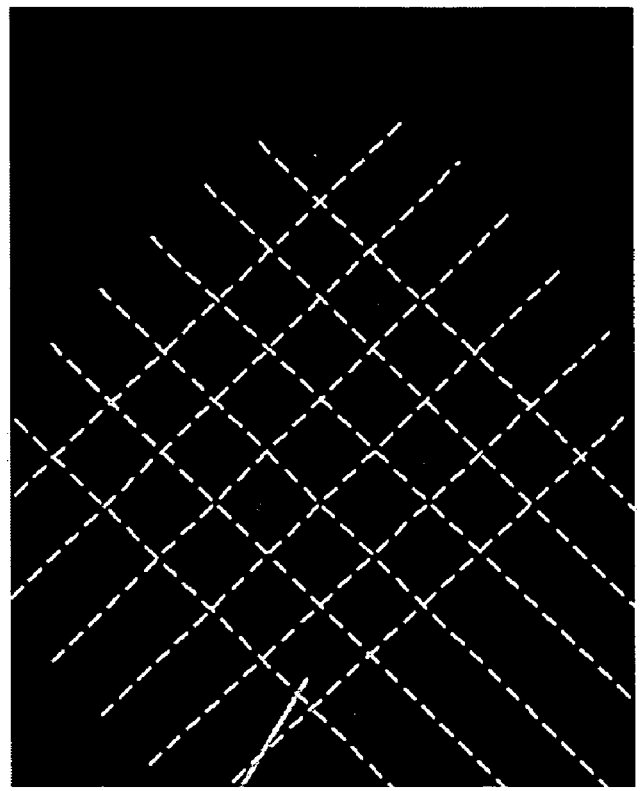
FIG. 6A depicts an optical image of collimated light from a focal pad of out-of-plane microlens array.

The focusing capabilities of the microlens array were determined by projecting collimated radiation at about 630 nm onto the fabricated microlens array and acquiring the focused image with a CCD camera (DXC-960MD SONY) in a Nikon OPTIPHOT-88 optical measurement microscope. FIGS. 6A and 6B are photographs of the focused image, at different scales. The pixels or lenses at the edges of the array were partial microlenses, so the corresponding focal pads were not as bright as those for the central region of the array. The pixel size of the microlens array was 248 μm by 248 μm. The diameter of the focused pads was approximately 19 μm.

EXAMPLE 8

Figure 7:
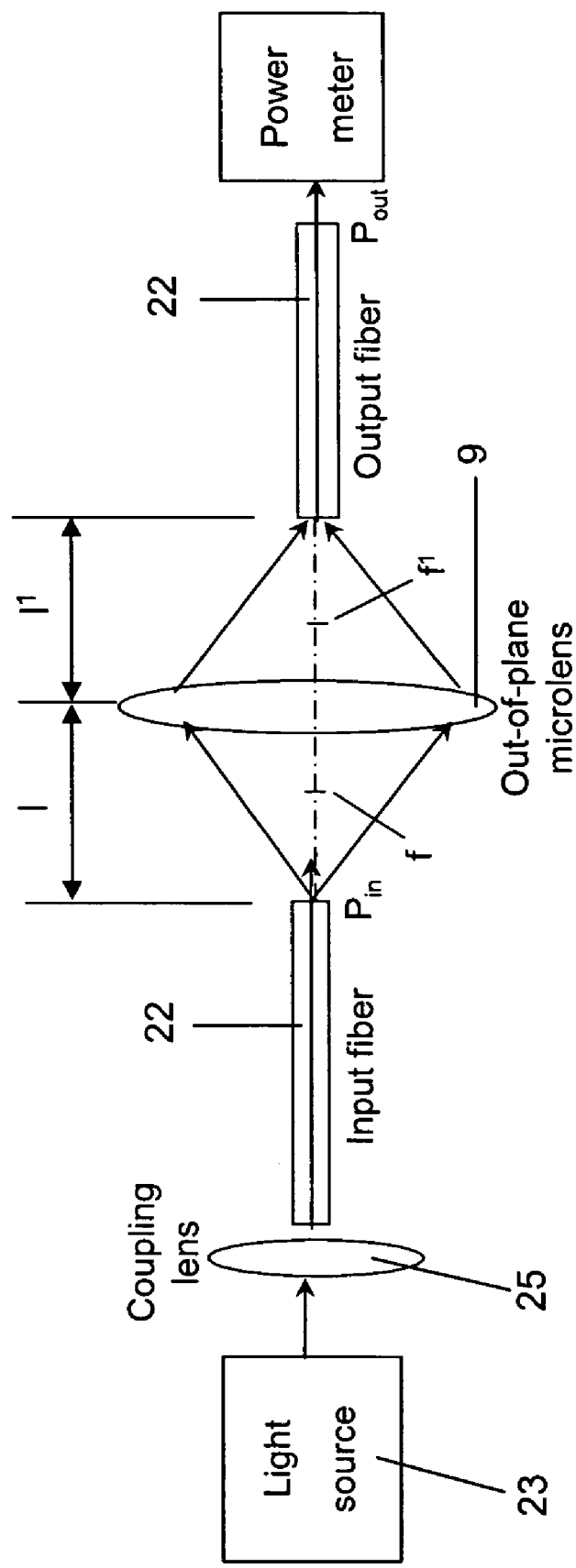
FIG. 7 depicts a schematic diagram of a testing apparatus used to determine coupling efficiency for the present invention.

Coupling efficiency for the prototype was tested as shown schematically in FIG. 7. A broadband source (A1010 Arc lamp, Photon Technology International) or a laser diode (DL5038-021, Thorlabs, Nowton, N.J.) served as the light source 23. For testing a single fiber, we used a laser diode with a wavelength of 635 nm. We focused the source with a coupling microscope lens 25 (NA=0.4, 40×). The plastic coating at the end of an optical fiber was stripped, and the fiber was then terminated using a cleaver. One end of the fiber 22 was fixed in the fiberport collimator (not shown in FIG. 7 for clarity) facing the objective lens 25. We adjusted the distance between the fiberport collimator and the microscope lens to maximize the output power at the opposite end of the fiber. A power meter.(FieldMate 1067353, Coherent Inc., Santa Clara, Calif.) was used to measure the input and output light power. The light then passed through an out-of-plane microlens 9, which focused the light on the output fiber 22. The end of the output fiber 22 was perpendicular to the photo-cell, and slightly touched the central area of the cell surface.

After the output power from the transmitting optical fiber was measured, the transmitting fiber was inserted into a positioning hole in the fiberport collimator. A second optical fiber (the receiving fiber) was then inserted into the holder-groove opposite the collimator. To determine coupling efficiency we compared the input power ($P_{in}$) to the output power ($P_{out}$) of the receiving optical fiber. The coupling efficiency in decibels (dB) was then calculated; $dB=-10\log(P_{out}/P_{in})$. The coupling efficiency (CE) may also be expressed as percent transmission: $CE=(P_{out}/P_{in})\times 100\%$.

Figure 8:
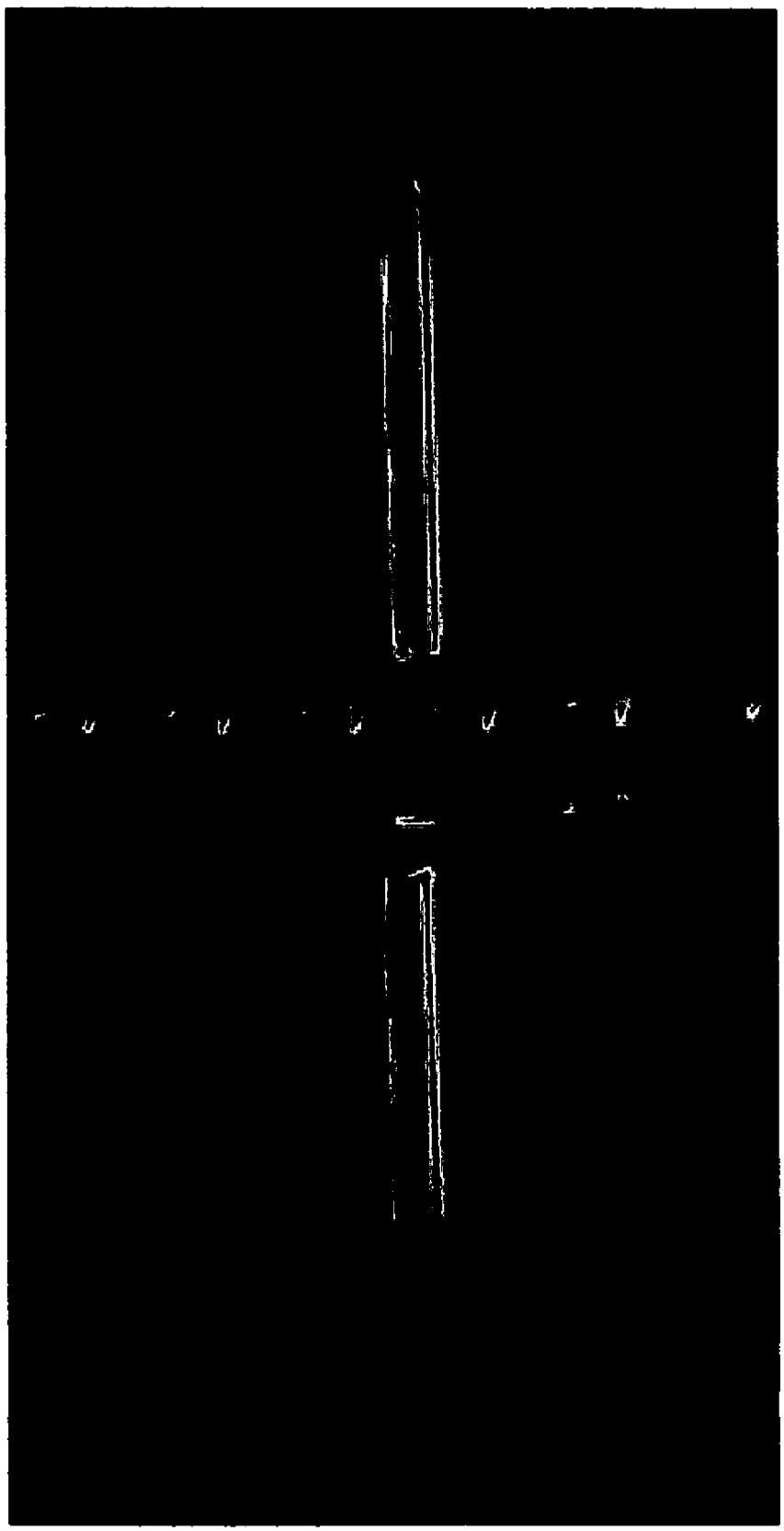
FIG. 8 depicts a photograph of the top view of fiber bundle coupler with a single fiber inserted.

We adjusted the distance between a fiber pair and the coupling microlens to obtain the highest coupling coefficient. FIG. 8 shows a photograph of the prototype fiber bundle coupler with one input fiber and one output fiber. The distances between the microlens array and the ends of the fibers, l and l', were approximately 2 times the focal length f, where l is slightly longer than 2f and l' slightly shorter than 2f. The highest coupling efficiency was achieved when the numerical apertures (NA) of the microlens and the optical fiber were matched (i.e., the NA of a microlens was equal to or larger than the NA of the corresponding optical fiber).

Both multi-mode optical fibers (GIF625 from Thorlabs Inc. Newton, N.J.) and single mode fibers (TBII single mode fiber, Corning Inc., Corning, N.Y.) were tested for fiber coupling efficiency. The GIF625 multi-mode fiber had a graded index fiber with NA=0.275 and a core diameter of 62.5 μm. The TBII single mode fiber had a NA of 0.13 and core diameter of 8 μm. Both a broadband light source and a 635 nm laser were used. For the multi-mode optical fiber, the coupling efficiency was 44.7% using the broadband light source, and 24.5% using a laser diode with a wavelength of 635 nm. For the single mode optical fiber, the coupling efficiency was about 22.7% for the laser diode at 635 nm.

EXAMPLES 9-11

All three groups of out-of-plane microlens arrays described in Examples 3-5 were tested. The coupling efficiency (CE) was found to be a function of pixel size for pixels from about 100 μm to 400 μm. Group 1 masks (multi-mode) generally showed low CE. They showed an increase in CE as the pixel size increase. For all of these fiber couplers, the cross-talk between neighboring fibers was too small to measure.

Group 1 masks (single-mode) also showed low CE for all pixel sizes tested, with their highest CE at about 400 μm.

Group 2 masks (multi-mode) showed near zero coupling efficiency for the smaller pixels. These masks showed an increased coupling efficiency with pixel size to about 300 μm, and then a rapid decrease above 300 μm.

Group 2 masks (single-mode) showed similar results to the multi-mode test, but the highest CE for these masks was observed at about 225 μm, with a CE about one half that observed for the multi-mode test.

Group 3 masks (multi-mode) showed good coupling efficiency at about 150 μm, and a significant increase in coupling efficiency at about 225 μm with a rapid decrease in CE as the pixel size increased.

Group 3 masks (single-mode) showed the highest CE at about 150 μm, with a rapid decrease at larger pixel sizes.

The complete disclosures of all references cited in this specification are hereby incorporated by reference. In the event of an otherwise irreconcilable conflict, however, the present specification shall control.

We claim:

1. An integral device that is adapted to optically couple a plurality of optical fibers to a plurality of optical elements; wherein said device comprises:
   (a) a substrate;
   (b) a first collimator array, rigidly attached to said substrate, wherein said first collimator array comprises a plurality of first through-holes, wherein each of said first through-holes is adapted to receive an optical fiber and to hold the optical fiber in position, and wherein each of said first through-holes has a fixed position relative to said substrate;
   (c) a second collimator array, rigidly attached to said substrate, wherein said second collimator array comprises a plurality of second through-holes, wherein each of said second through-holes is adapted to receive an optical element and to hold the optical element in position, and wherein each of said second through-holes has a fixed position relative to said substrate; and
   (d) one or more lens arrays, rigidly attached to said substrate, wherein each said lens array comprises a plurality of optical lenses, wherein the optical properties and positions of each of said lenses are adapted to optically couple an optical fiber positioned in one of said first through-holes to an optical element in one of said second through-holes, and wherein each of said lenses has a fixed position relative to said substrate;

and wherein:

(e) said first and second collimator arrays and said one or more lens arrays are integral, formed from a single polymeric piece.

2. A device as in claim 1, wherein each of said first and second collimator arrays and said one or more lens arrays are perpendicular to said substrate.

3. A device as in claim 1, wherein said device is adapted to optically couple a plurality of optical fibers to a plurality of optical elements, wherein each of the optical elements is also an optical fiber.

4. A device as in claim 1, wherein all of said plurality of first through-holes are parallel to one another; and wherein all of said plurality of second through-holes are parallel to one another.

5. A device as in claim 1, wherein said device is adapted to couple optical fibers in said first collimator array to optical elements in said second collimator array, with a translational tolerance of 20 μm or less, without adjustment by a user.

6. A device as in claim 1, wherein said device is adapted to couple optical fibers in said first collimator array to optical elements in said second collimator array, with a translational tolerance of 10 μm or less, without adjustment by a user.

7. A device as in claim 1, wherein said device is adapted to couple optical fibers in said first collimator array to optical elements in said second collimator array, with a translational tolerance of 5 μm or less, without adjustment by a user.

8. A device as in claim 1, wherein said device is adapted to couple optical fibers in said first collimator array to optical elements in said second collimator array, with a translational tolerance of 2 μm or less, without adjustment by a user.

9. A device as in claim 1, wherein said device is adapted to couple optical fibers in said first collimator array to optical elements in said second collimator array, with a translational tolerance of 1 μm or less, without adjustment by a user.

10. A device as in claim 1, wherein said device is adapted to couple optical fibers in said first collimator array to optical elements in said second collimator array, with a translational tolerance of 0.5 μm or less, without adjustment by a user.

11. A device as in claim 1, wherein said device is adapted to couple optical fibers in said first collimator array to optical elements in said second collimator array, with a translational tolerance of 0.1 μm or less, without adjustment by a user.

12. A device as in claim 1, wherein said device is adapted to couple optical fibers in said first collimator array to optical elements in said second collimator array, with a tilt tolerance of 10° or less, without adjustment by a user.

13. A device as in claim 1, wherein said device is adapted to couple optical fibers in said first collimator array to optical elements in said second collimator array, with a tilt tolerance of 5° or less, without adjustment by a user.

14. A device as in claim 1, wherein said device is adapted to couple optical fibers in said first collimator array to optical elements in said second collimator array, with a tilt tolerance of 2° or less, without adjustment by a user.

15. A device as in claim 1, wherein said device is adapted to couple optical fibers in said first collimator array to optical elements in said second collimator array, with a tilt tolerance of 1° or less, without adjustment by a user.

16. A device as in claim 1, wherein said device is adapted to couple optical fibers in said first collimator array to optical elements in said second collimator array, with a tilt tolerance of 0.5° or less, without adjustment by a user.

17. A device as in claim 1, comprising a single said lens array.

18. A device as in claim 1, comprising two said lens arrays.

19. A device as in claim 1, wherein said polymeric piece is formed from a polymeric negative photoresist.

20. A device as in claim 1, wherein said polymeric piece is formed from SU-8.

* * * * *